US012792535B2

United States Patent

(12) United States Patent
Zhu

(10) Patent No.: US 12,792,535 B2
(45) Date of Patent: Nov. 10, 2026

(54) METHODS AND APPARATUS FOR PROVIDING INTER-COMPONENTS COMMUNICATIONS USING A DUAL-PORTS SHARED MEMORY

(71) Applicant: GOWIN Semiconductor Corporation, GuangZhou (CN)

(72) Inventor: Jinghui Zhu, San Jose, CA (US)

(73) Assignee: GOWIN Semiconductor Corporation, GuangZhou (CN)

( * ) Notice: Subject to any disclaimer, the term of this patent is extended or adjusted under 35 U.S.C. 154(b) by 9 days.

(21) Appl. No.: 18/932,385

(22) Filed: Oct. 30, 2024

(65) Prior Publication Data

US 2026/0119422 A1 Apr. 30, 2026

(51) Int. Cl.
*G06F 13/20* (2006.01)
*G06F 5/06* (2006.01)

(52) U.S. Cl.
CPC ................ *G06F 13/20* (2013.01); *G06F 5/06* (2013.01); *G06F 2213/40* (2013.01)

(58) Field of Classification Search
CPC ........ G06F 13/20; G06F 2213/40; G06F 5/00; G06F 5/06; G06F 5/10; G06F 5/01; G06F 13/1663; G06F 13/1652; G06F 15/167
See application file for complete search history.

(56) References Cited

U.S. PATENT DOCUMENTS 7,685,340 B1 * 3/2010 Gaither ............... H04L 25/0278 710/63
8,352,774 B2 * 1/2013 Elrabaa ..................... G06F 5/14 713/600
9,672,008 B2 * 6/2017 Keller ....................... G11C 8/16
12,229,323 B2 * 2/2025 Saarinen ............... H04L 9/0631
2005/0078544 A1 * 4/2005 Vogel ....................... G11C 7/22 365/221

* cited by examiner

*Primary Examiner* — Idriss N Alrobaye
*Assistant Examiner* — Richard B Franklin
(74) *Attorney, Agent, or Firm* — JW Law Group; James M. Wu

(57) ABSTRACT

A device having one or more semiconductor chips includes a shared memory for facilitating circuits or inter-components communications. The device or chip includes a processing block, a field programmable gate array ("FPGA") block, and a dual-ports shared memory ("DSM"). The processing block is configured to processing data in accordance with a first clock speed. FPGA block, having multiple configurable logic blocks ("LBs"), is able to be selectively programmed to perform one or more logic functions based on a second clock speed. The DSM, in one embodiment, includes a first port and a second port. While the first port operable in the first clock speed is coupled to the processing block, the second port operable in the second clock speed is coupled to the FPGA block for facilitating communication between the processing block and the FPGA block.

21 Claims, 10 Drawing Sheets

METHODS AND APPARATUS FOR PROVIDING INTER-COMPONENTS COMMUNICATIONS USING A DUAL-PORTS SHARED MEMORY

FIELD

The exemplary embodiment(s) of the present application relates to the field of computer devices. More specifically, the exemplary embodiment(s) of the present invention relates to programmable semiconductor devices for providing device or inter-components communications ("ICC").

BACKGROUND

With increasing popularity of digital computations, network communications, artificial intelligence ("AI"), IoT ("Internet of Things"), and/or robotic controls, there is an increasing demand for high-speed and flexible semiconductor chips. One conventional approach to satisfy this demand is the use of dedicated custom integrated circuits and/or application-specific integrated circuits ("ASICs"). However, a shortcoming relating to ASIC approach is lacking flexibility.

A popular alternative approach is the utilization of programmable semiconductor devices ("PSDs") such as programmable logic devices ("PLDs") or field-programmable gate arrays ("FPGAs"). A feature of PSD is that it allows an end-user to program and/or reprogram PSDs to perform one or more desirable functions to suit a variety of diverse applications after the PSDs are fabricated.

A drawback, however, associated with a conventional PSD is clock speed which is often slower than ASIC devices. For example, while a typical PSD clock speed runs between 200 to 800 megahertz ("MHz"), a typical clock speed for a microprocessor or central processing unit ("CPU") can be from 1 to 10 Gigahertz ("GHz"). It is a challenge for facilitating communication between a CPU and FPGA with reasonable or limited latency.

SUMMARY

A device or ICC system having one or more semiconductor chips includes a shared memory for facilitating circuits or inter-components communications. The device or chip includes a processing component, FPGA component, and a dual-ports shared memory ("DSM"). The processing component or block is able to process data in accordance with a high clock speed. FPGA component or block, having multiple configurable logic blocks ("LBs"), is able to be selectively programmed to perform one or more logic functions based on a normal FPGA clock speed. DSM, in one embodiment, includes a fast-clock port and a normal-clock port. While the fast-clock port operable in the high clock speed is coupled to the processing component or block, the second port operable in the normal clock speed is coupled to FPGA component or block for facilitating communication between the processing block and FPGA.

Additional features and benefits of the exemplary embodiment(s) of the present invention will become apparent from the detailed description, figures, and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
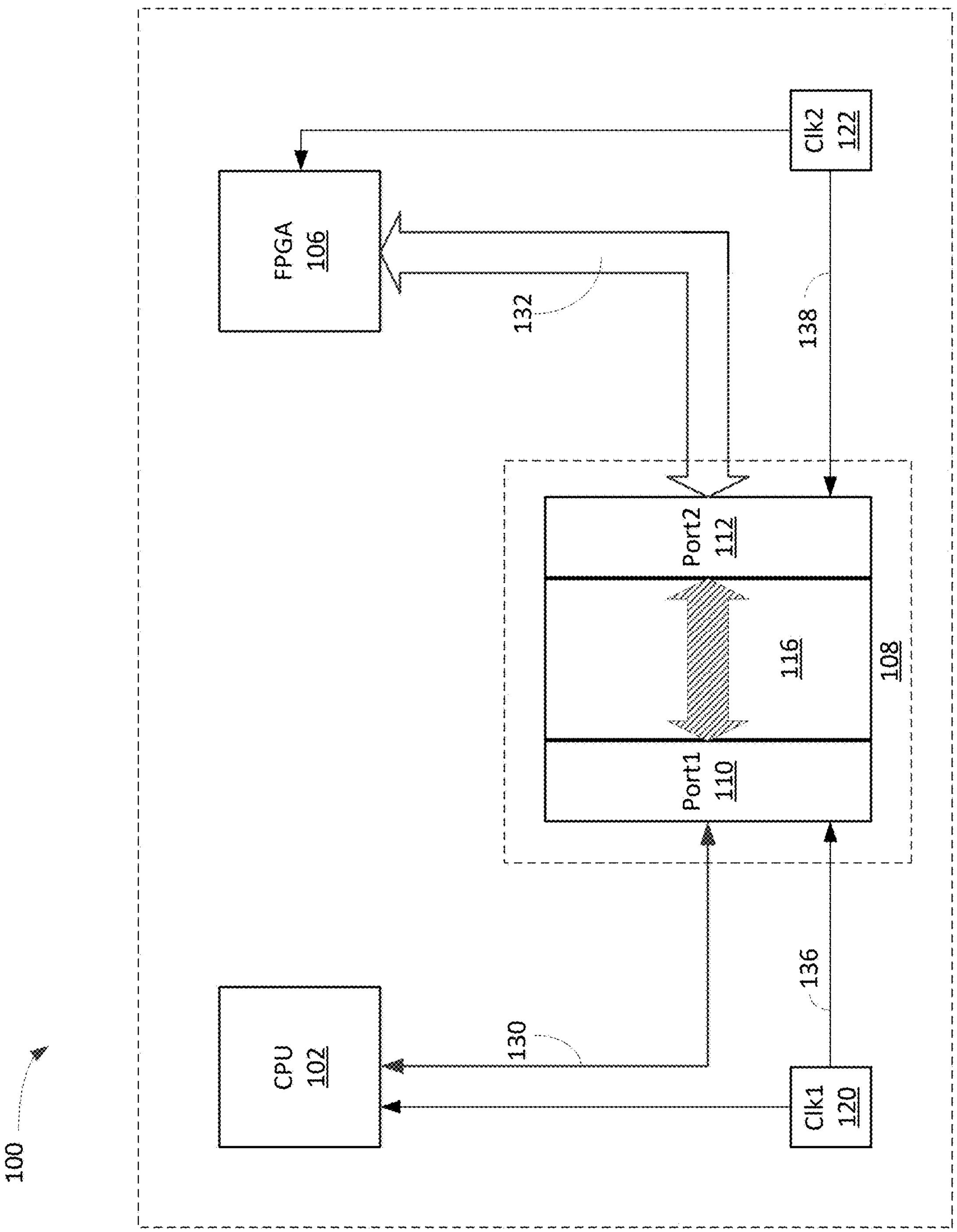
FIG. 1 is a block diagram illustrating a device, circuit, or die containing a CPU block, FPGA block, and DSM for facilitating inter-components communications ("ICC") in accordance with one embodiment of the present invention.

Embodiments of the present invention disclose a method(s) and/or apparatus for providing inter-components communications ("ICC") between circuits, block, or components using one or more dual-ports shared memory ("DSM").

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations included herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that although such a development effort might be complex and time-consuming, it would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all components of a given apparatus (e.g., device) or method. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field-programmable gate arrays (FPGAs), application-specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, it may be stored on a tangible medium such as a computer memory device, such as but not limited to, magnetoresistive random access memory ("MRAM"), phase-change memory, or ferroelectric RAM ("FeRAM"), flash memory, resistive random-access memory ("ReRAM" or "RRAM"), conductive-bridging RAM ("CBRAM"), ROM (Read Only Memory), PROM (Programmable Read-Only Memory), EEPROM (Electrically Erasable Programmable Read-Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instructions wherein the computer refers to one or a cluster of computers, personal computers, workstations, mainframes, or combinations of computers thereof.

A device having one or more semiconductor chips includes a shared memory for facilitating circuits or inter-components communications. The device or chip includes a processing block, a field programmable gate array ("FPGA") block, and a dual-ports shared memory ("DSM"). The processing block is configured to processing data in accordance with a first clock speed. FPGA block, having multiple configurable logic blocks ("LBs"), is able to be selectively programmed to perform one or more logic functions based on a second clock speed. The DSM, in one embodiment, includes a first port and a second port. While the first port operable in the first clock speed is coupled to the processing block, the second port operable in the second clock speed is coupled to the FPGA block for facilitating communication between the processing block and the FPGA block.

FIG. 1 is a block diagram 100 illustrating a device, circuit, or die containing a CPU component or block, FPGA component or block, and DSM for facilitating inter-components communications ("ICC") between CPU and FPGA in accordance with one embodiment of the present invention. Diagram 100, in one embodiment, illustrates an ICC system containing a CPU circuit or block 102, FPGA circuit or block 106, and DSM 108. To simplify forgoing discussion, the terms "component," "circuit," "circuitry," and "block," are referring the same or similar elements that can be used interchangeably. It should be noted that It should be noted that the underlying concept of the exemplary embodiment(s) of the present invention would not change if one or more blocks (circuit or components) were added to or removed from diagram 100.

Diagram 100, in one embodiment, illustrates a semiconductor chip or die configured to perform functions of a network on chip ("NOC") or network interface controller ("NIC") for providing and/or facilitating ICC between circuitries or blocks, such as, but not limited to, CPU block, FPGA block, and the like. An NOC, in one example, can be configured as a network subsystem containing multiple modules placed in a system on a chip ("SoC"). An exemplary NOC can be a router facilitating information transmission between connected modules such as CPU, MCU, and the like. An NIC, which is similar to NOC, is an interface controller containing hardware components capable of connecting a system or device to a computer network. In an alternative embodiment, diagram 100 is a semiconductor module capable of hosting multiple chips or dies including, but not limited to, CPU chip, FPGA chip, and/or memory chips. It should be noted that the terms "chip" and "die" can refer to similar semiconductor integrated circuits ("ICs").

A CPU, also known as microprocessor, processor, central processor, and/or main processor, is an integrated circuit ("IC") capable of executing instructions coded in a program. The program controls various functions, such as arithmetic, logic, controlling, and input/output (I/O) operations. In one example, CPU is able to manage various external components, such as memory devices, I/O interfaces, and/or specialized coprocessors such as graphics processing units (GPUs).

FPGA or PLD is a programmable IC which can be configured and/or reconfigured by a user after manufacturing. FPGA generally includes groups of configurable logic blocks and configurable interconnects to perform user defined logic functions. FPGAs can be used for various applications including, but not limited to, prototyping, signal processing, embedded systems, accelerators, and/or networking.

Referring back to diagram 100, the semiconductor chip includes CPU block 102, FPGA block 106, DSM 108, clock1 120, and clock2 122 for facilitating inter-components, inter-blocks, or inter-circuits communications. CPU block 102 is a computing processing component capable of processing data based on instructions in accordance with a CPU clock such as clock1 120. In one example, processing block or CPU block 102 is a microprocessor block operable with high-speed clock cycles. Alternatively, CPU block 102 is a high-performance microcontroller unit ("MCU") operable over one (1) gigahertz ("GHz") clock cycles. It should be noted that CPU block 102 is able to be structured based on embedded microprocessors with any CPU architectures, such as, but not limited to, ARM® embedded processors, Intel® Core™ Duo, Core™ Quad, Xeon®, Pentium™ microprocessor, Motorola™ 68040, AMD® family processors, or Power PC™ microprocessor.

FPGA block 106, in one aspect, includes configurable logic blocks ("LBs") which are able to be selectively programmed by a user(s) to perform one or more user-defined logic functions based on a second clock speed clocked by Clk2 122. The clock speed for FPGA block 106, for example, can be operable around 200 MHz. Some programmable logic devices ("PLDs") can run up to one (1) gigahertz ("GHz") clock cycles.

DSM 108, in one embodiment, includes at least two ports 110-112 operating independently in different clock zones.

Port1 110, for example, operates in a first clock speed which can be in a GHz range for handling data transmission to and from CPU block 102. Port2 112 is a second port operable in a second clock speed which can be in an MHz range for handling data transmission to and from FPGA block 106. A function of DSM 108 is to facilitate ICC between CPU block 102 and FPGA block 106.

DSM 108, in one embodiment, includes port1 110, port2 112, and shared memory 116. A function of shared memory 116 is to provide physical connections between port1 110 and port2 112. In one example, port1 110 is connected to CPU block 102 via a port1 bus 130. A function of port1 110 is to operate at a fast clock speed which is clocked by CLK1 120 for transmitting or receiving information between DSM 108 and CPU block 102. Port2 112, in one example, is connected to FPGA block 106 via FPGA bus 132. A function of port2 112 is to operate a normal clock speed clocked by CLK2 122 for transmitting or receiving information between DSM 108 and FPGA block 106. Port1 110 of DSM 108 is considered as a high-speed port operating over one (1) gigahertz ("GHz") clock cycles. Port2 112 of DSM 108 is a normal clock speed port operating under one (1) gigahertz ("GHz") clock cycles.

To accommodate smooth data transfer between CPU block 102 operating at a fast clock speed and FPGA block 106 operating at a slower clock speed, a wider FPGA bus 132 in comparing to CPU bus 130 is employed. For example, if Clk1 120 clocks at 1 GHz and Clk2 122 clocks at 100 MHz, FPGA bus 132 should be at least 10 time wider than CPU bus 130 for smooth data transmission with minimal latency. In one embodiment, DSM 108 further includes a memory access arbiter used to reduce memory access collisions within DSM 108. It should be noted that various different bus protocols including, but not limited to, advanced high-performance bus ("AHB"), advanced system bus ("ASB"), and/or advanced peripheral bus ("APB") can be used for CUP bus 130 and/or FPGA bus 132.

DSM 108, in one embodiment, is a static random access memory ("SRAM") or random access memory ("RAM") with multiple ports operable independently. In one example, the storage size for DSM 108 is between 1 Megabytes ("MB") and 100 MB. In alternative embodiments, DSM 108 can also be a nonvolatile memory ("NVM"), a magnetoresistive random access memory ("MRAM"), a phase-change memory ("PCM"), a random access memory ("RAM"), a ferroelectric RAM ("FeRAM"), a resistive random-access memory ("RRAM"), and/or conductive-bridging RAM ("CBRAM") for facilitating intra-die circuitry communications. It should be noted that the size of storage capacity in DMS 108 can be configurable by users based on applications.

DSM 108, known as dual port memory, can be, in one aspect, a portion local memory in CPU 102. For example, a portion of cache memory of CPU 102 can be allocated to perform various functions of DMS 108. Alternatively, DSM 108 can be a part of memory cells in FPGA 106 and configured to perform various functions of DMS 108. Depending on the applications, functions of DMS 108 can be accomplished by shared components (e.g., CPU 102, and FPGA 106) of the chip, die, module, and/or device illustrated in diagram 100.

Diagram 100, in one aspect, illustrates a semiconductor module capable of housing multiple dies or chips. For example, the semiconductor module includes a CPU die or chip 102, FPGA die or chip 106, DSM 108, and clock circuitries 120-122. In addition, the semiconductor module includes various connections 130-138 configured to provide ICC between dies, chips, and/or circuitries. In one embodiment, a printed circuit board ("PCB") can be used in the semiconductor module for housing various chips or dies.

In operation, CPU block 102, operating in a fast clock cycle clocked by Clk1 120, transmits a stream of data to FPGA block 106 operating in a slower clock cycle clocked by Clk2 122 via DSM 108. DSM 108 is coupled to CPU bus 130 via port1 110 and is connected to FPGA bus 132 via port2 112. Upon receipt of the stream of data from port1 110, port2 112 forwards the received stream of data to FPGA block 106 via FPGA bus 132 which is a wider bus than CPU bus 130.

An advantage of employing DSM 108 is to provide data transfer to and from different components operating with different clock speeds.

Figure 2:
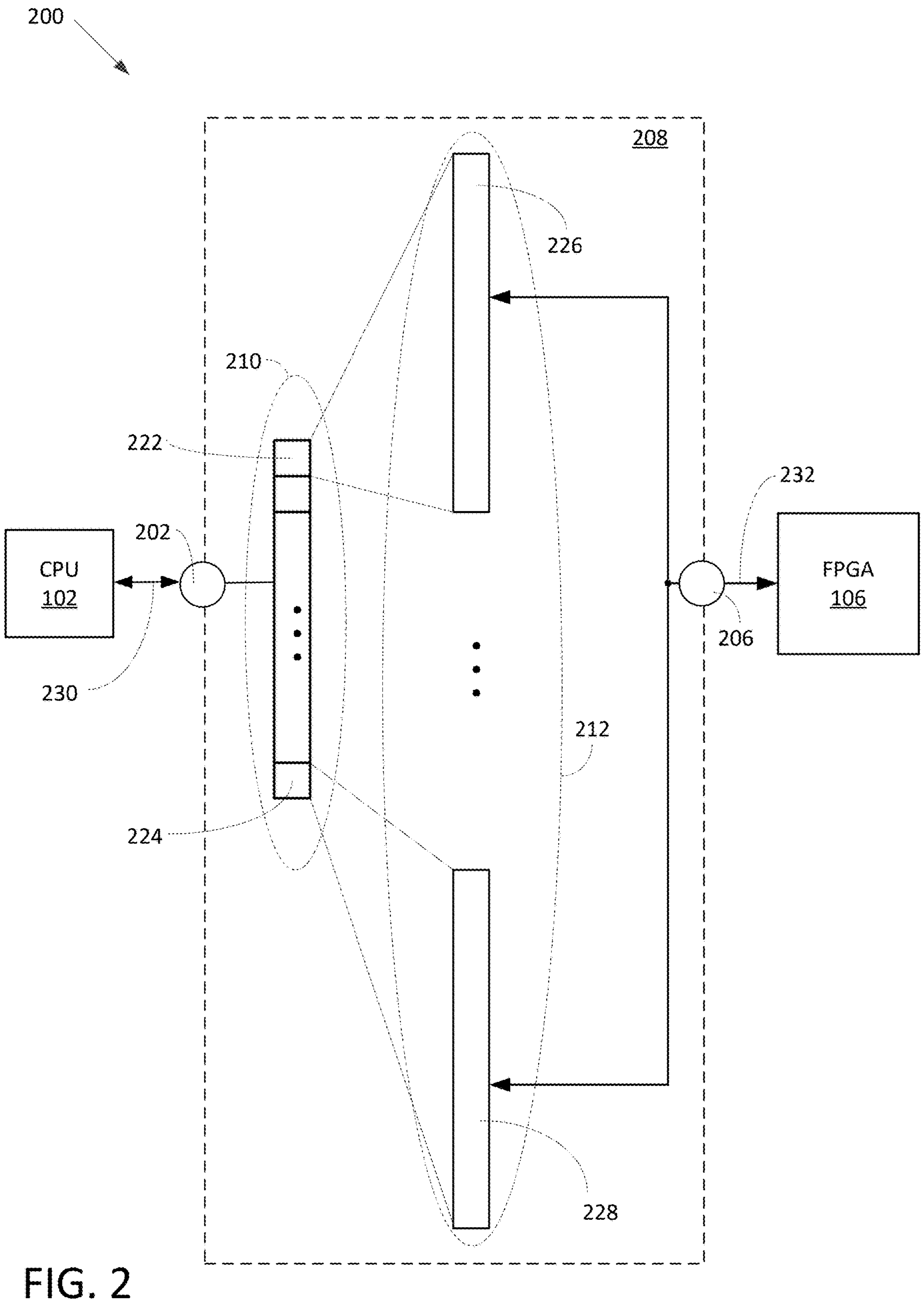
FIG. 2 is a block diagram illustrating a chip or die containing a DSM for facilitating ICC between components or circuitry blocks in accordance with one embodiment of the present invention.

FIG. 2 is a block diagram 200 illustrating a chip or die containing a DSM for facilitating ICC between components or circuitry blocks in accordance with one embodiment of the present invention. Diagram 200 includes CPU 102, FPGA 106, and DSM 208 wherein DSM 208 includes a high-speed port 202 and a normal speed port 206. It should be noted that the underlying concept of the exemplary embodiment(s) of the present invention would not change if one or more blocks (circuit or components) were added to or removed from diagram 200.

DSM 208 includes multiple storage segments such as segments 210 and 212. Each segment is further divided into multiple memory groups such as memory groups 222-228. In one embodiment, segment 210 is configured to operate within a high-speed clock cycle and segment 212 operates under a normal (or slower) clock cycles. It should be noted that the storage capacity of segment 210 is the same or similar to the storage capacity of segment 212, and memory capacities of memory groups 222-224 are the same or similar memory capacities of memory groups 226-228. In one example, storage segments such as segment 210 are used to interface with CPU 102 via the high-speed port 202 using high-speed clock cycles. The storage segments such as segment 212 are used to interface with FPGA 106 via the normal speed port 206 using normal speed clock cycles.

Bus 230 is used to couple CPU 102 with high-speed port 202 and is capable of handling high-speed data transmission. Bus 232 is used to couple FPGA 106 to normal speed port 206 and is able to handle normal speed data transmission. In one aspect, bus 232 is a wider bus capable of transmitting more bits of data than bus 230. While bus 232 operates under a normal speed clock cycle and bus 230 operates under a high-speed clock cycle, the amount of data passing through or data throughput is roughly the same since bus 232 is a wider bus than bus 230.

CPU 102, high-speed port 202, bus 230, and storage segment 210 are configured to operate based on a high-speed clock zone (e.g., greater than 1 Ghz). FPGA 106, normal speed port 206, bus 232, and storage segment 212 are configured to operate based on a normal clock zone (e.g., less than 1 GHz). With bus 232 is a wider bus, the overall data throughput between buses 230-232 are roughly the same. In operation, bus 232 can transmit bits in groups 226-228 simultaneously from groups 226-228 to FGPA 106. Similarly, bus 230 can transmit data stored in segment 210 to CPU 102 quickly since bus 230 operates under a high-speed clock rate.

Figure 3:
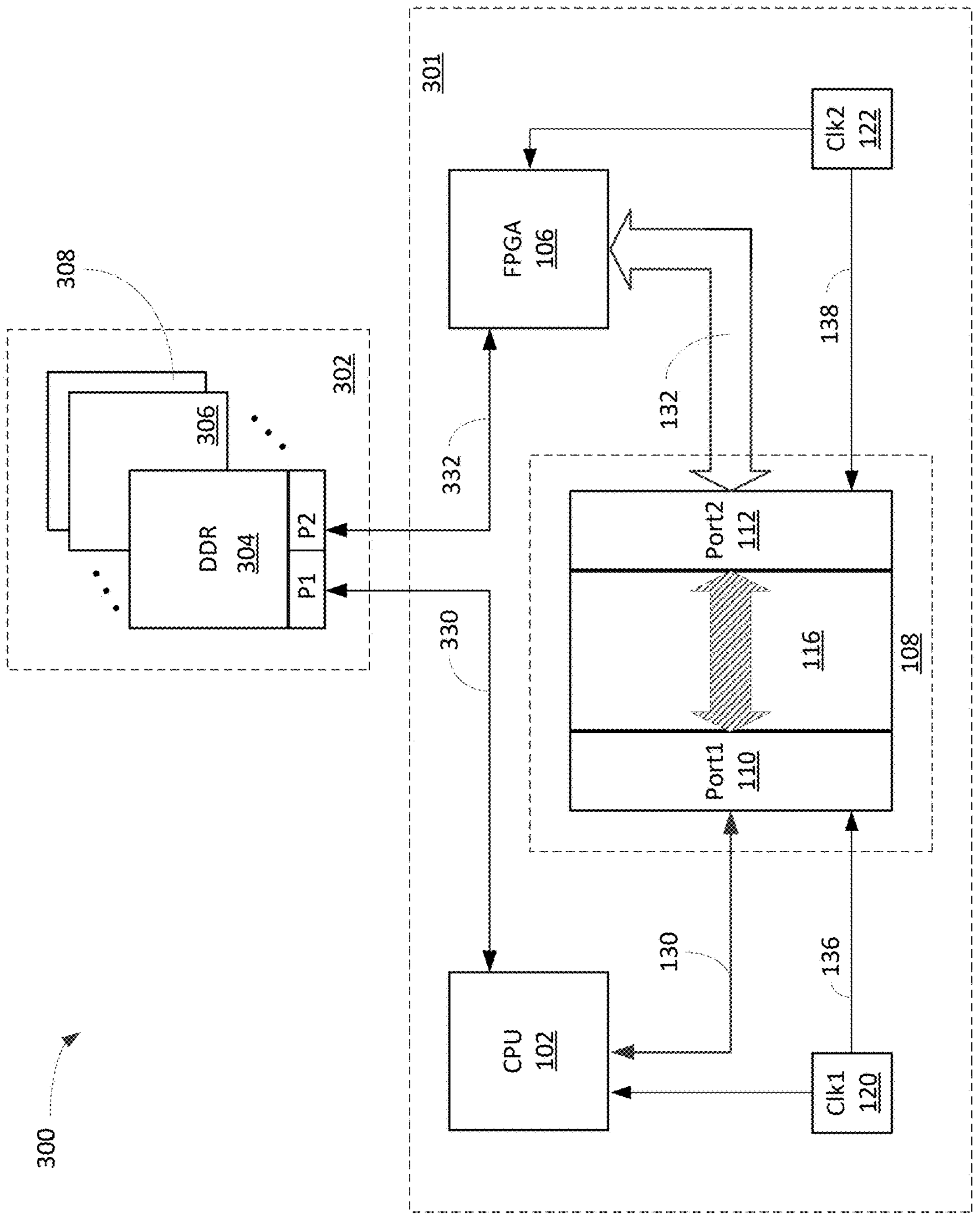
FIG. 3 is a block diagram illustrating an alternative embodiment of using external storage for facilitating ICC or inter-devices communications in accordance with one embodiment of the present invention.

FIG. 3 is a block diagram 300 illustrating an alternative embodiment of using external storage for facilitating ICC or inter-devices communications in accordance with one embodiment of the present invention. Diagram 300 shows a configurable device 301 and a storage device 302, wherein configurable device 301 is similar to the semiconductor chip shown in FIG. 1 except additional buses 330-332 for interfacing with external storage device such as device 302. In one embodiment, storage device 302 is used to provide unlimited storage space for facilitating ICC with multiple clock zones. It should be noted that the underlying concept of the exemplary embodiment(s) of the present invention would not change if one or more blocks (circuit or elements) were added to or removed from diagram 300.

Storage device 302, in one embodiment, includes multiple pages of double data rate ("DDR") memory 304-308 wherein at least one of DDR memory such as DDR 304 contains two independent ports P1 and P2. P1 is used to connect to CPU 102 via bus 330 for facilitating high-speed data transmission under high-speed clock cycles. P2 is used to connect to FPGA 106 via bus 332 for facilitating normal speed data transmission under normal speed clock cycles. In one aspect, bus 332 is configured to be a wider bus thank bus 330. For example, bus 332 can be 10 times wider than bus 330.

An advantage of using storage device 302 is to provide an unlimited shared memory space whereby data bursting at CPU side of transmission can be smoothly handled at FPGA side. For example, for direct memory access ("DMA") applications, storage device 302 can provide additional features for handling data transfer between CPU 102 and FPGA 106 operating under different clock zones.

For latency sensitive applications, DMS 108 can be used to handle data transmission between CPU 102 and FPGA 106. It should be noted that the size of storage capacity in DMS 108 and/or storage device 302 can be configurable by users based on the applications. It should also be noted that number of ports which are capable of operating in different clock zones can be programmed based on the applications.

Figure 4:
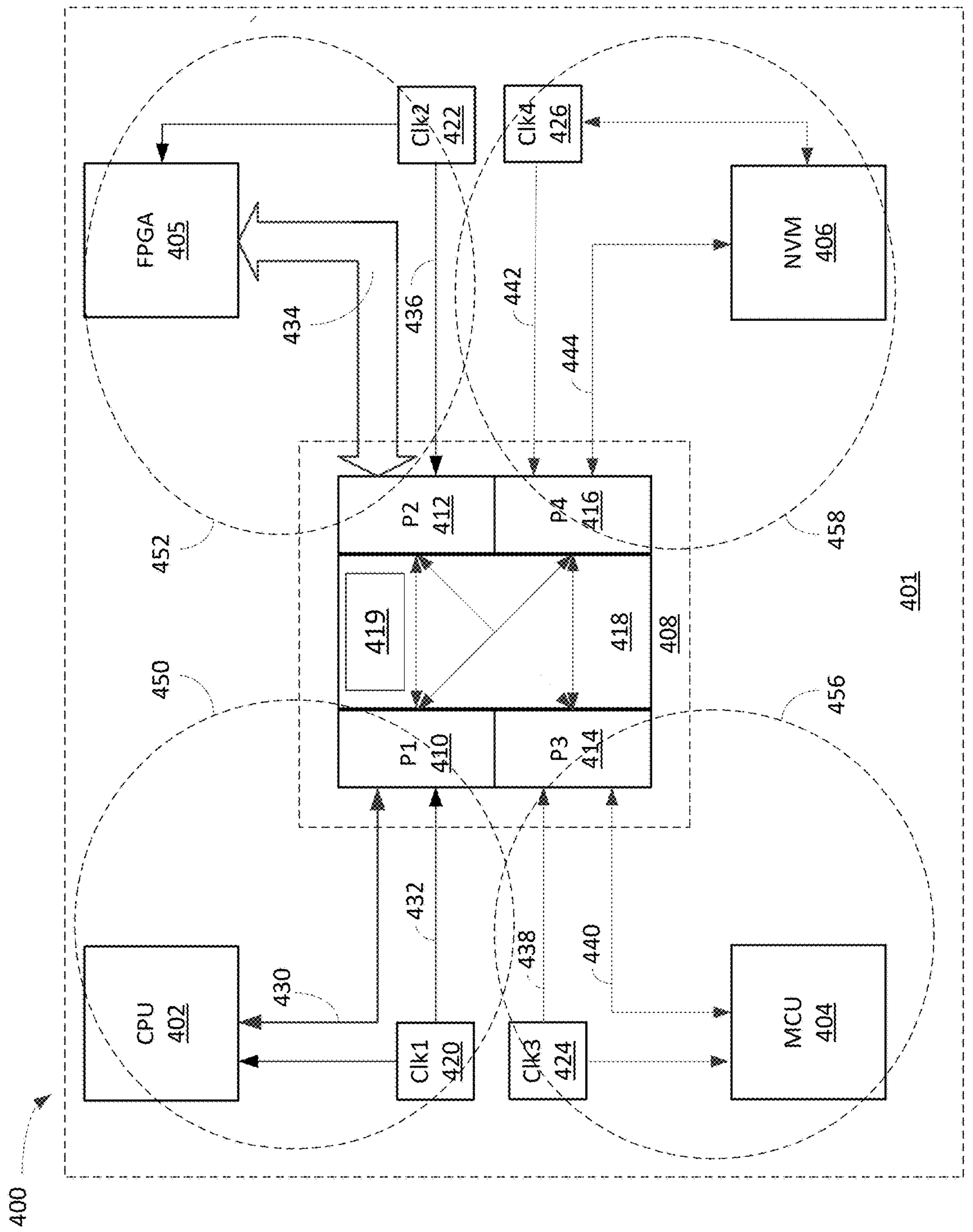
FIG. 4 is a block diagram illustrating an alternative embodiment of using a quad-ports shared memory for facilitating inter-blocks communications in accordance with one embodiment of the present invention.

FIG. 4 is a block diagram 400 illustrating an alternative embodiment of using a quad-ports shared memory ("QSM") 408 for facilitating ICC between multiple internal blocks in accordance with one embodiment of the present invention. Diagram 400 is similar to Diagram 100 shown in FIG. 1 except that diagram 400 includes QSM 408, microcontroller unit ("MCU") 404, and NVM 406. It should be noted that the underlying concept of the exemplary embodiment(s) of the present invention would not change if one or more blocks (circuit or elements) were added to or removed from diagram 400.

Diagram 400 illustrates a semiconductor device 401 containing a CPU block 402, FPGA block 405, MCU block 404, and NVM 406. Semiconductor device 401, in one aspect, can be a semiconductor die, semiconductor chip, IC, module, and/or the like. In one embodiment, semiconductor device 401 has four clock zones 450-458 clocked by clock circuits 420-426.

Clock zone 450, in one embodiment, includes CPU or CPU block 402, clock circuit 420, and port1 410 of QSM 408. Clock circuit 420 provides a processor clock rate to CPU block 402 and port1 410 via buses 430-432. Shared memory 418 of QSM 408 is used to facilitate data transmission between ports 410-416.

Clock zone 452, in one embodiment, includes FPGA or FPGA block 405, clock circuit 422, and port2 412 of QSM 408. Clock circuit 422 provides an FPGA clock rate to FPGA block 405 and port2 412 via buses 434-436. Shared memory 418 of QSM 408 is used to facilitate data transmission between ports 410-416.

Clock zone 456, in one embodiment, includes MCU or MCU block 404, clock circuit 424, and port3 414 of QSM 408. Clock circuit 424 provides an MCU clock rate to MCU block 404 and port1 414 via buses 438-440. Shared memory 418 of QSM 408 is used to facilitate data transmission between ports 410-416.

Clock zone 458, in one embodiment, includes NVM or NVM block 406, clock circuit 426, and port4 416 of QSM 408. Clock circuit 426 provides an NVM clock rate to NVM block 406 and port4 416 via buses 442-444. Shared memory 418 of QSM 408 is used to facilitate data transmission between ports 410-416.

In one embodiment, QSM 408 is a configurable shared memory which can be programmed to handle two, three, or four clock zones based on user's preferences. It should be noted that the buses' width can also be programmable based on the clock speeds. It should be further noted that different components (e.g., digital signal processors ("DSPs"), or GPUs) can be used for different applications.

QSM 408 further includes a shared memory arbiter ("SMA") 419 for reducing port or bus access collision. SMA 419, in one embodiment, is a programmable SMA capable of provide shared memory management with minimal access collision. For example, SMA 419 can be configured to set a higher priority for a CPU clock zone when CPU performance is important. Alternatively, SMA 419 can be configured to set a higher priority for an FPGA clock zone if keeping memory capacity low in QSM 408 is important.

An ICC system, in one embodiment, can be a semiconductor die containing a shared memory for facilitating ICC. In one embodiment, the ICC system includes a microprocessor circuitry 402, FPGA circuitry 405, and DSM wherein DSM 408 is configurable. Microprocessor circuitry 402 is configured to processing data based on execution of instruction in accordance with a first clock speed operable over one (1) gigahertz ("GHz"). FPGA circuitry 405 includes LBs able to be selectively programmed to perform one or more logic functions based on a second clock speed operable under one (1) GHz. DSM 408, in one aspect, DSM includes a first port 410 and a second port 412 wherein first port 410 is coupled to microprocessor circuitry 402 for facilitating communication between the microprocessor circuitry 402 and DSM 408. Second port 412 is coupled to FPGA circuitry 405 for facilitating inter-components communications between FPGA circuitry 405 and DSM 408.

It should be noted that microprocessor circuitry 402 can be a high-performance MCU, CPU, or a graphic processing unit ("GPU"), and a digital signal processors ("DSP"). DSM 408 is structured with SRAM or RAM with multiple ports capable of operating independently. In one aspect, DSM 408 is configurable to handle inter-components communications for more than two components operating under different clock domains.

Programmable Semiconductor Device (PSD)

Figure 5:
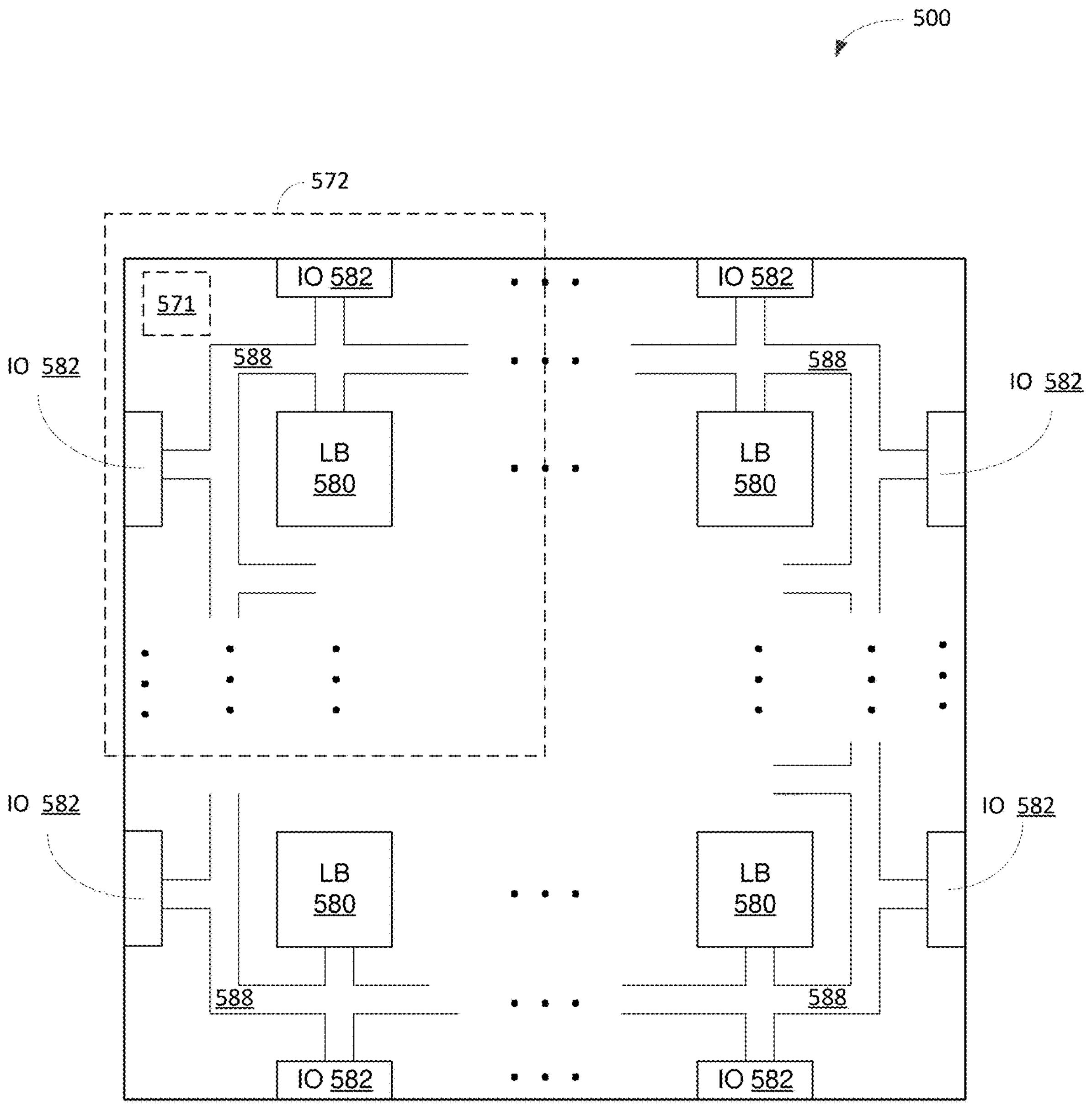
FIGS. 5-7 are block diagrams illustrating a programmable semiconductor device ("PSD") or FPGA using DSM for facilitating ICC in accordance with one embodiment of the present invention.

FIG. 5 is a block diagram illustrating a programmable semiconductor device ("PSD") or FPGA using DSM or QSM for facilitating ICC in an ICC system in accordance with one embodiment of the present invention. PSD, also known as FPGA, PIC, and/or a type of Programmable Logic Device ("PLD"), employs a DSM interface 571 for providing component or block inter-communications. It should be noted that the underlying concept of the exemplary embodiment(s) of the present invention would not change if one or more blocks (circuit or elements) were added to or removed from diagram 500.

PSD includes an array of configurable LBs 580 surrounded by input/output blocks ("IOs") 582, and programmable interconnect resources 588 ("PIR") that include vertical interconnections and horizontal interconnections extending between the rows and columns of LBs 580 and IO 582. PRI 588 may further include interconnecting array decoders ("IAD") or programmable interconnection array ("PIA"). It should be noted that the terms PRI, IAD, and PIA may be used interchangeably hereinafter.

Each LB, in one example, includes programmable combinational circuitry and selectable output registers programmed to implement at least a portion of a user's logic function. The programmable interconnections, connections, or channels of interconnect resources are configured using various switches to generate signal paths between the LBs 580 for performing logic functions. Each IO 582 is programmable to selectively use an IO pin (not shown) of PSD.

PIC, in one embodiment, can be divided into multiple programmable partitioned regions ("PPRs") 572 wherein each PPR 572 includes a portion of LBs 580, some PPRs 588, and IOs 582. A benefit of organizing PIC into multiple PPRs 572 is to optimize management of storage capacity, power supply, and/or network transmission.

Bitstream of configuration data is a binary sequence (or a file) containing programming information or data for a PIC, FPGA, or PLD. The bitstream is created to reflect the user's logic functions together with certain controlling information. For an FPGA or PLD to function properly, at least a portion of the registers or flipflops in FPGA needs to be programmed or configured before it can function. It should be noted that bitstream is used as input configuration data to FPGA.

Figure 6:
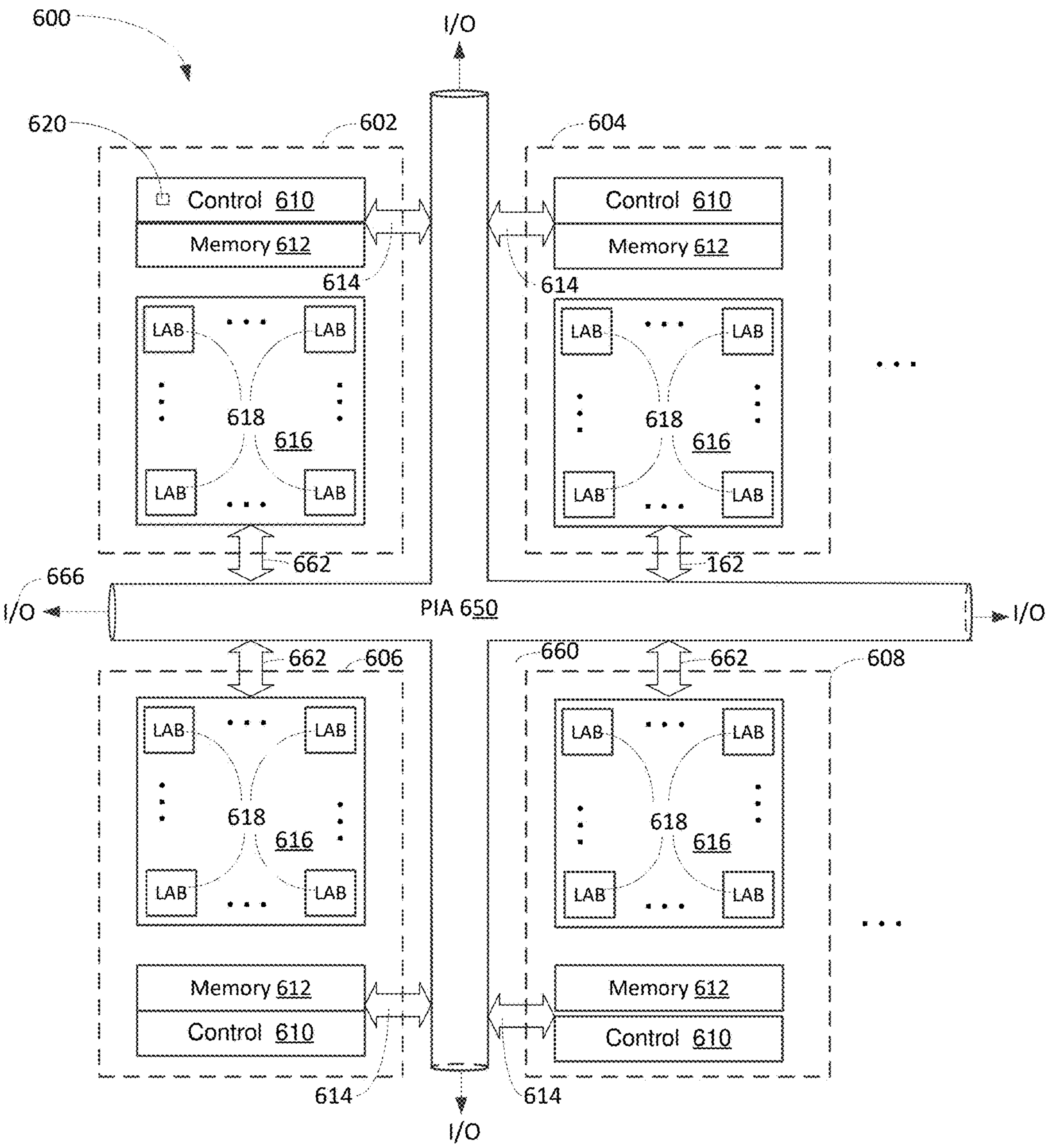

FIG. 6 is a block diagram illustrating a programmable semiconductor device ("PSD") or FPGA operable to carry out device ICC using DSM interface 620 in accordance with one embodiment of the present invention. To simplify the foregoing discussion, the terms "PSD", "PIC", FPGA, and PLD are referring the same or similar devices and they can be used interchangeably hereinafter. Diagram 600 includes multiple PPRs 602-608, PIA 650, and regional IO ports 666. PPRs 602-608 further includes control units 610, memory 612, and LBs 616. Note that control units 610 can be configured into one single control unit, and similarly, memory 612 can also be configured into one single memory for storing configurations. It should be noted that the underlying concept of the exemplary embodiment(s) of the present invention would not change if one or more blocks (circuit or elements) were added to or removed from diagram 600.

LBs 616, also known as configurable function unit ("CFU") include multiple logic array blocks ("LABs") 618 which is also known as a configurable logic unit ("CLU"). Each LAB 616, for example, can be further organized to include, among other circuits, a set of programmable logical elements ("LEs"), configurable logic slices ("CLS"), or macrocells, not shown in FIG. 6. Each LAB, in one example, may include anywhere from 32 to 612 programmable LEs. IO pins (not shown in FIG. 6), LABs, and LEs are linked by PIA 650 and/or other buses, such as buses 662 or 614, for facilitating communication between PIA 650 and PPRs 602-608.

Each LE includes programmable circuits such as the product-term matrix, lookup tables, and/or registers. LE is also known as a cell, configurable logic block ("CLB"), slice, CFU, macrocell, and the like. Each LE can be independently configured to perform sequential and/or combinatorial logic operation(s). It should be noted that the underlying concept of PSD would not change if one or more blocks and/or circuits were added or removed from PSD.

Control units 610, also known as configuration logics, can be a single control unit. Control unit 610, for instance, manages and/or configures individual LE in LAB 618 based on the configuring information stored in memory 612. It should be noted that some IO ports or IO pins are configurable so that they can be configured as input pins and/or output pins. Some IO pins are programmed as bi-directional IO pins while other IO pins are programmed as unidirectional IO pins. The control units such as unit 610 are used to handle and/or manage PSD operations in accordance with system clock signals.

LBs 616 include multiple LABs that can be programmed by the end-user(s). Each LAB contains multiple LEs wherein each LE further includes one or more lookup tables ("LUTs") as well as one or more registers (or D flip-flops or latches). Depending on the applications, LEs can be configured to perform user-specific functions based on a predefined functional library facilitated by the configuration software. PSD, in some applications, also includes a set fixed circuit for performing specific functions. For example, the fixed circuits include, but not limited to, a processor(s), a DSP (digital signal processing) unit(s), a wireless transceiver(s), and so forth.

PIA 650 is coupled to LBs 616 via various internal buses such as buses 614 or 662. In some embodiments, buses 614 or 662 are part of PIA 650. Each bus includes channels or wires for transmitting signals. It should be noted that the terms channel, routing channel, wire, bus, connection, and interconnection are referred to as the same or similar connections and will be used interchangeably herein. PIA 650 can also be used to receive and/or transmits data directly or indirectly from/to other devices via IO pins and LABs.

Memory 612 may include multiple storage units situated across a PPR. Alternatively, memories 612 can be combined into one single memory unit in PSD. In one embodiment, memory 612 is an NVM storage unit used for both configuration and user memory. The NVM storage unit can be, but not limited to, MRAM, flash, Ferroelectric RAM, and/or phase changing memory (or chalcogenide RAM). Depending on the applications, a portion of the memory 612 can be designated, allocated, or configured to be a block RAM ("BRAM") used for storing large amounts of data in PSD.

A PSD includes many programmable or configurable LBs 616 that are interconnected by PIA 650, wherein each programmable LB is further divided into multiple LABs 618. Each LAB 618 further includes many LUTs, multiplexers and/or registers. During configuration, a user programs a truth table for each LUT to implement a desired logical function. For example, a four-input (16 bit) LUT receives LUT inputs from a routing structure (not shown in FIG. 6). Based upon the truth table programmed into LUT during configuration of PSD, a combinatorial output is generated via a programmed truth table of LUT in accordance with the logic values of LUT inputs. The combinatorial output is subsequently latched or buffered in a register or flip-flop before the clock cycle ends.

In one embodiment, control unit 610 includes a configuration logic or memory using LMB 620.

Figure 7:
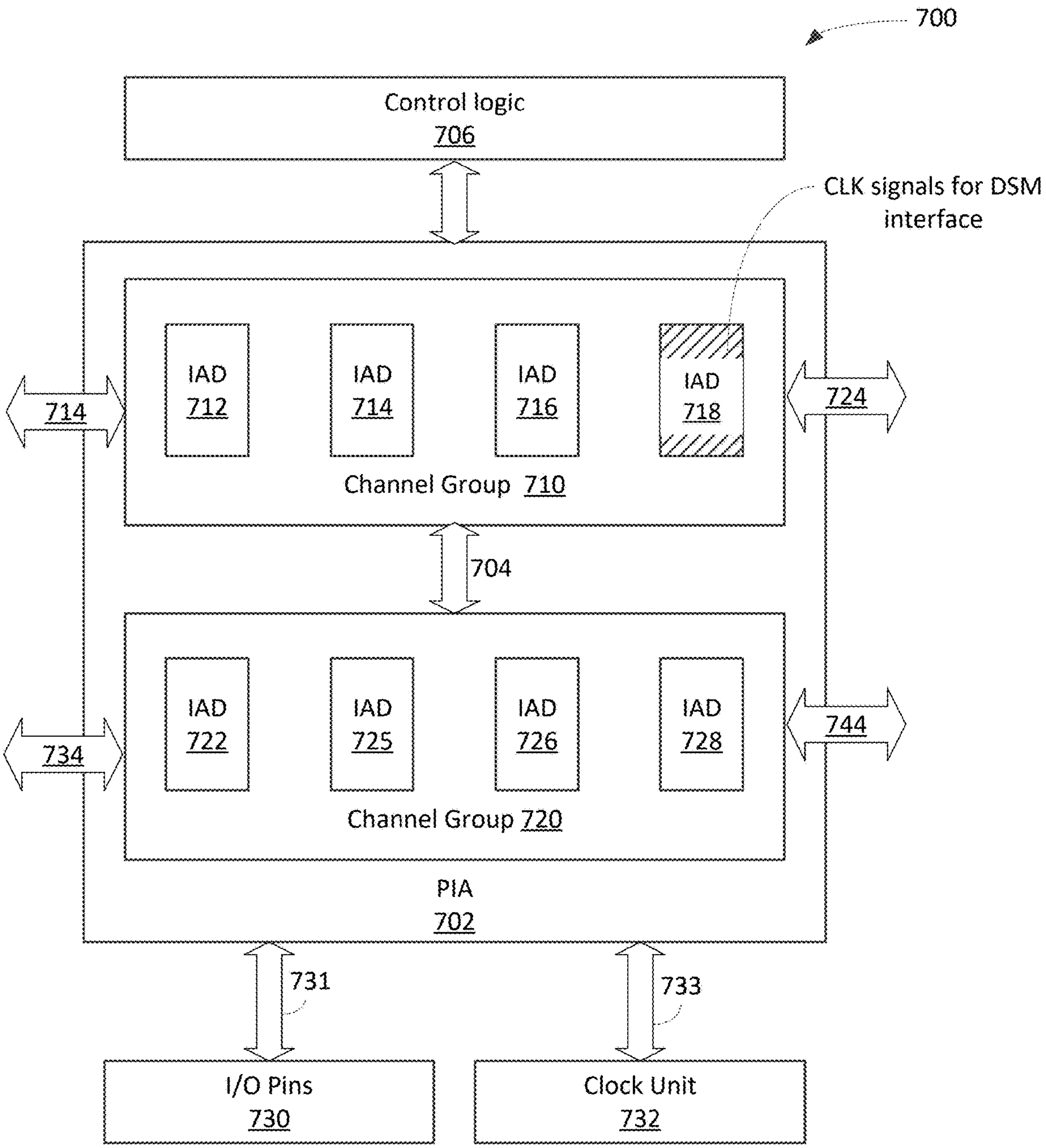

FIG. 7 is a block diagram 700 illustrating a routing logic or routing fabric containing programmable interconnection arrays capable of routing data and/or clock signals for facilitating ICC in FPGA in accordance with one embodiment of the present invention. Diagram 700 includes control logic 706, PIA 702, IO pins 730, and clock unit 732. Control logic 706 provides various control functions including channel assignment, differential IO standards, and clock management. Control logic 706 may contain volatile memory, non-volatile memory, and/or a combination of the volatile and nonvolatile memory device for storing information such as configuration data. In one embodiment, control logic 706 is incorporated into PIA 702. It should be noted that the underlying concept of the exemplary embodiment(s) of the present invention would not change if one or more blocks (circuit or elements) were added to or removed from diagram 700.

IO pins 730, connected to PIA 702 via a bus 731, contain many programmable IO pins configured to receive and/or transmit signals to external devices. Each programmable IO pin, for instance, can be configured to input, output, and/or bi-directional pin. Depending on the applications, IO pins 730 may be incorporated into control logic 706.

Clock unit 732, in one example, connected to PIA 702 via a bus 733, receives various clock signals from other components, such as a clock tree circuit or a global clock oscillator. Clock unit 732, in one instance, generates clock signals in response to system clocks as well as reference clocks for implementing IO communications. Depending on the applications, clock unit 732, for example, provides clock signals to PIA 702 including reference clock(s).

PIA 702, in one aspect, is organized into an array scheme including channel groups 710 and 720, bus 704, and IO buses 714, 724, 734, 744. Channel groups 710, 720 are used to facilitate routing information between LBs based on PIA configurations. Channel groups can also communicate with each other via internal buses or connections such as bus 704. Channel group 710 further includes interconnecting array decoders ("IADs") 712-718. Channel group 720 includes four IADs 722-728. A function of IAD is to provide configurable routing resources for data transmission.

IAD such as IAD 712 includes routing multiplexers or selectors for routing signals between IO pins, feedback outputs, and/or LAB inputs to reach their destinations. For example, an IAD can include up to 36 multiplexers which can be laid out in four banks wherein each bank contains nine rows of multiplexers. It should be noted that the number of IADs within each channel group is a function of the number of LEs within the LAB.

PIA 702, in one embodiment, designates a special IAD such as IAD 718 for facilitating inter-components communications as well as DSM interface.

Systems and Network Systems

Figure 8:
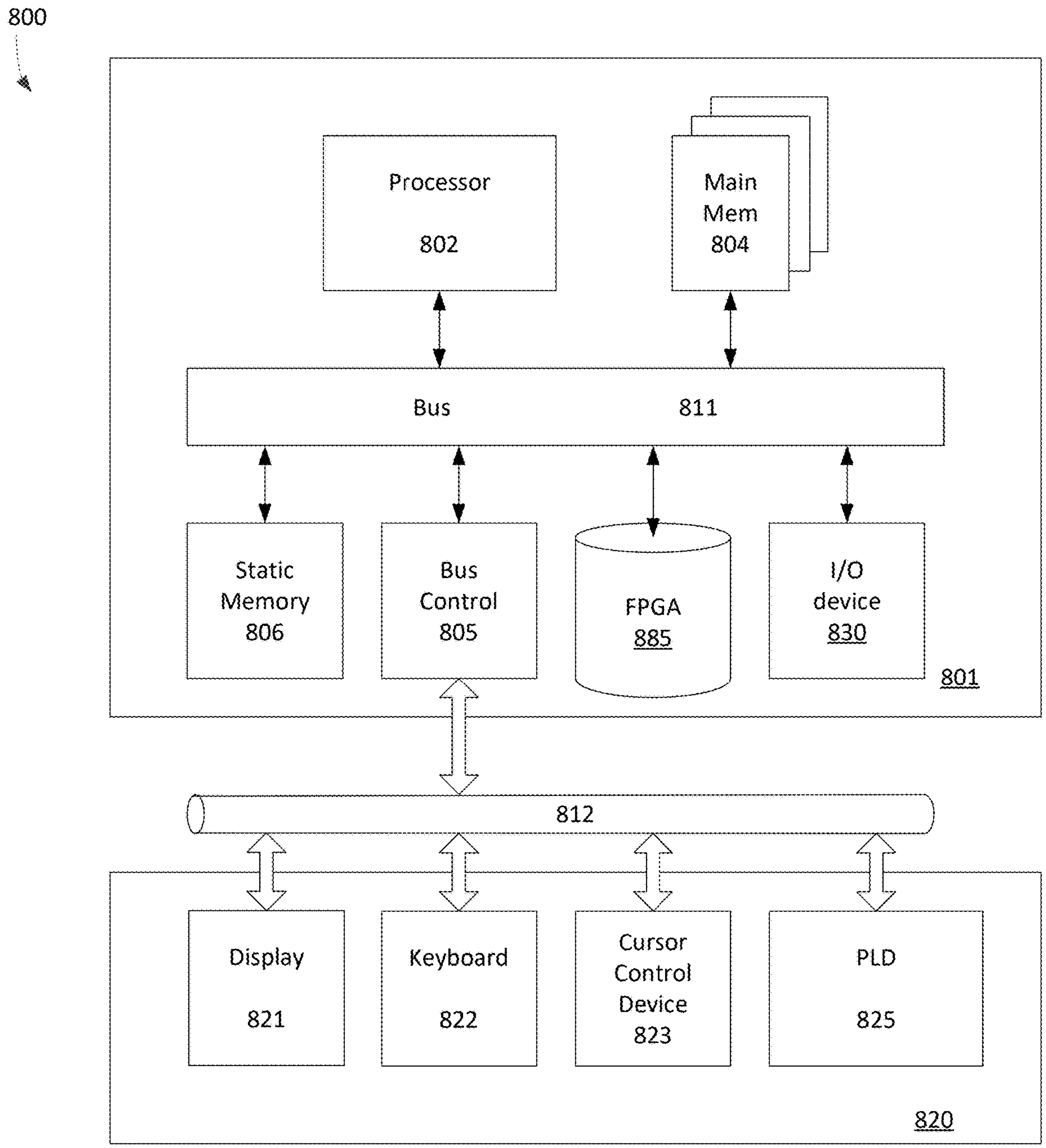
FIG. 8 is a diagram illustrating a system or computer using PSD employing DSM for ICC system in accordance with one embodiment of the present invention.

FIG. 8 is a diagram 800 illustrating a system or computer using PSD employing DSM for ICC system in accordance with one embodiment of the present invention. Computer system 800 includes a processing unit 801, an interface bus 812, and an input/output ("IO") unit 820. Processing unit 801 includes a processor 802, main memory 804, system bus 811, static memory device 806, bus control unit 805, IO element 830, and FPGA 885. It should be noted that the underlying concept of the exemplary embodiment(s) of the present invention would not change if one or more blocks (circuit or elements) were added to or removed from FIG. 8.

Bus 811 is used to transmit information between various components and processor 802 for data processing. Processor 802 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 804, which may include multiple levels of cache memories, stores frequently used data and instructions. Main memory 804 may be RAM (random access memory), MRAM (magnetic RAM), or flash memory. Static memory 806 may be a ROM (read-only memory), which is coupled to bus 811, for storing static information and/or instructions. Bus control unit 805 is coupled to buses 811-812 and controls which component, such as main memory 804 or processor 802, can use the bus. Bus control unit 805 manages the communications between bus 811 and bus 812. Mass storage memory or SSD which may be a magnetic disk, an optical disk, hard disk drive, floppy disk, CD-ROM, and/or flash memories are used for storing large amounts of data.

IO unit 820, in one embodiment, includes a display 821, keyboard 822, cursor control device 823, and low-power PLD 825. Display device 821 may be a liquid crystal device, cathode ray tube ("CRT"), touch-screen display, or other suitable display devices. Display 821 projects or displays images of a graphical planning board. Keyboard 822 may be a conventional alphanumeric input device for communicating information between computer system 800 and computer operator(s). Another type of user input device is cursor control device 823, such as a conventional mouse, touch mouse, trackball, or other types of the cursor for communicating information between system 800 and user(s).

PLD 825 is coupled to bus 812 for providing configurable logic functions to local as well as remote computers or servers through a wide-area network. PLD 825 and/or FPGA 885 are configured to facilitate low-power operation using dual NVM cells of LMBs to improve overall efficiency of FPGA and/or PLD. In one example, PLD 825 may be used in a modem or a network interface device for facilitating communication between computer 800 and the network. Computer system 800 may be coupled to servers via a network infrastructure as illustrated in the following discussion.

Figure 9:
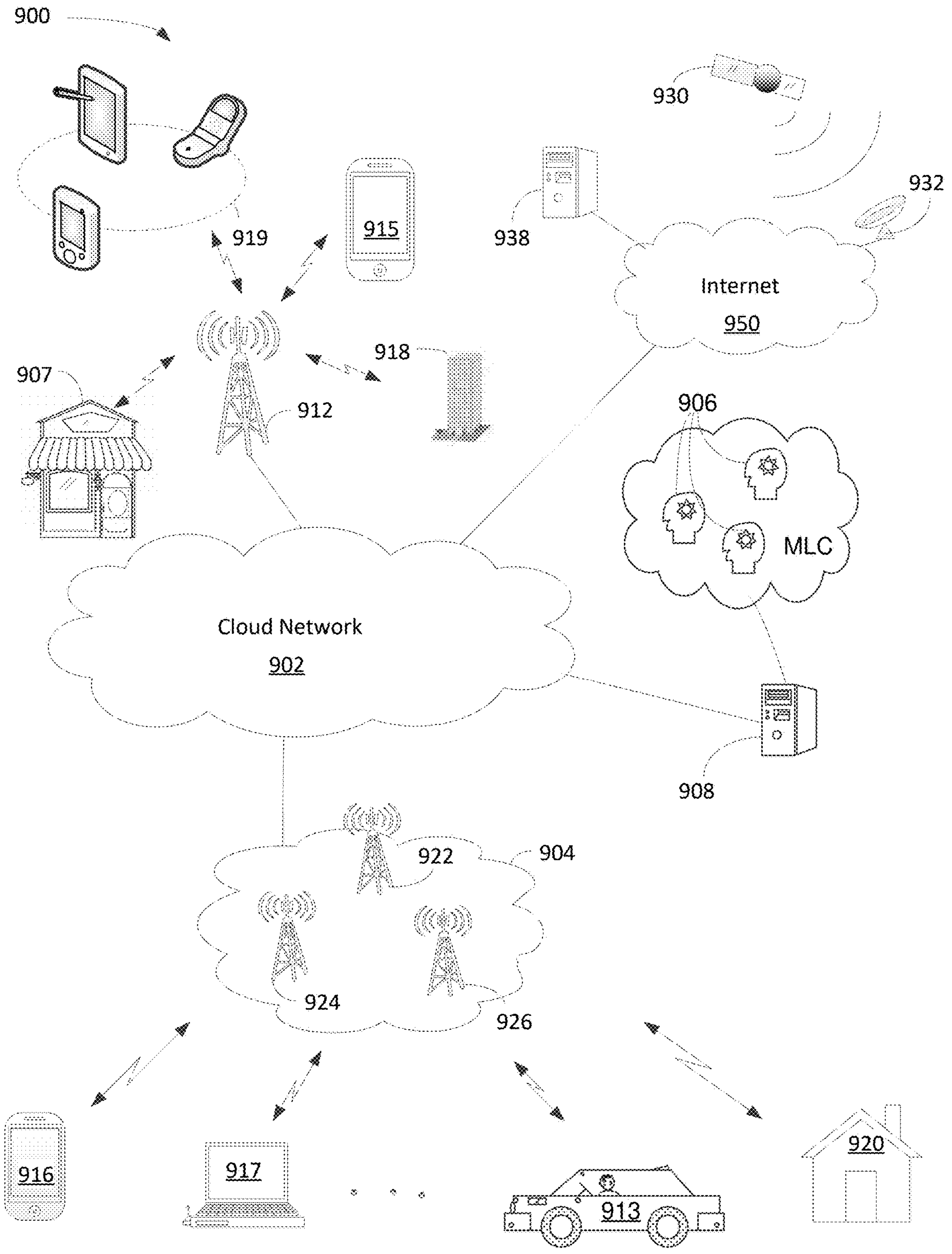
FIG. 9 is a block diagram illustrating a network layout containing ICC systems using PSD (e.g., FPGA, PLD, etc.) and DSM in accordance with one embodiment of the present invention.

FIG. 9 is a block diagram 900 illustrating a network layout containing ICC systems using PSD (e.g., FPGA, PLD, etc.) and DSM in accordance with one embodiment of the present invention. Diagram 900 illustrates AI server 908, communication network 902, switching network 904, Internet 950, and portable electric devices 913-919. In one aspect, PSD capable of facilitating inter-components communications is used in an AI server, portable electric devices, and/or switching network. Network or cloud network 902 can be a wide area network, metropolitan area network ("MAN"), local area network ("LAN"), satellite/terrestrial network, or a combination of a wide-area network, MAN, and LAN. It should be noted that the underlying concept of the exemplary embodiment(s) of the present invention would not change if one or more blocks (or networks) were added to or removed from diagram 900.

Network 902 includes multiple network nodes, not shown in FIG. 9, wherein each node may include mobility management entity ("MME"), radio network controller ("RNC"), serving gateway ("S-GW"), packet data network gateway ("P-GW"), or Home Agent to provide various network functions. Network 902 is coupled to Internet 950, AI server 908, base station 912, and switching network 904. Server 908, in one embodiment, includes machine learning computers ("MLC") 906.

Switching network 904, which can be referred to as packet core network, includes cell sites 922-926 capable of providing radio access communication, such as 3G (3$^{rd}$ generation), 4G, or 5G cellular networks. Switching network 904, in one example, includes IP and/or Multiprotocol Label Switching ("MPLS") based network capable of operating at a layer of Open Systems Interconnection Basic Reference Model ("OSI model") for information transfer between clients and network servers. In one embodiment, switching network 904 logically couples multiple users and/or mobiles 916-920 across a geographic area via cellular and/or wireless networks. It should be noted that the geographic area may refer to campus, city, metropolitan area, country, continent, or the like.

Base station 912, also known as cell-site, node B, or eNodeB, includes a radio tower capable of coupling to various user equipments ("UEs") and/or electrical user equipments ("EUEs"). The term UEs and EUEs are referring to similar portable devices, and can be used interchangeably. For example, UEs or PEDs can be cellular phone 915, laptop computer 917, iPhone® 916, tablets, and/or iPad® 919 via wireless communications. A handheld device can also be a smartphone, such as iPhone®, BlackBerry®, Android®, and so on. Base station 912, in one example, facilitates network communication between mobile devices such as portable handheld device 913-919 via wired and wireless communications networks. It should be noted that base station 912 may include additional radio towers as well as other land switching circuitry.

Internet 950 is a computing network using Transmission Control Protocol/Internet Protocol ("TCP/IP") to provide linkage between geographically separated devices for communication. Internet 950, in one example, couples to supplier server 938 and satellite network 930 via satellite receiver 932. Satellite network 930, in one example, can provide many functions as wireless communication as well as a global positioning system ("GPS"). It should be noted that the UII and/or SDB operation enhancing efficiency of FPGA can benefit many applications, such as but not limited to, smartphones 913-919, satellite network 930, automobiles 913, AI servers 908, business 907, and homes 920.

The exemplary embodiment of the present invention includes various processing steps, which will be described below. The steps of the embodiment may be embodied in machine or computer-executable instructions. The instructions can be used to cause a general-purpose or special-purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 10:
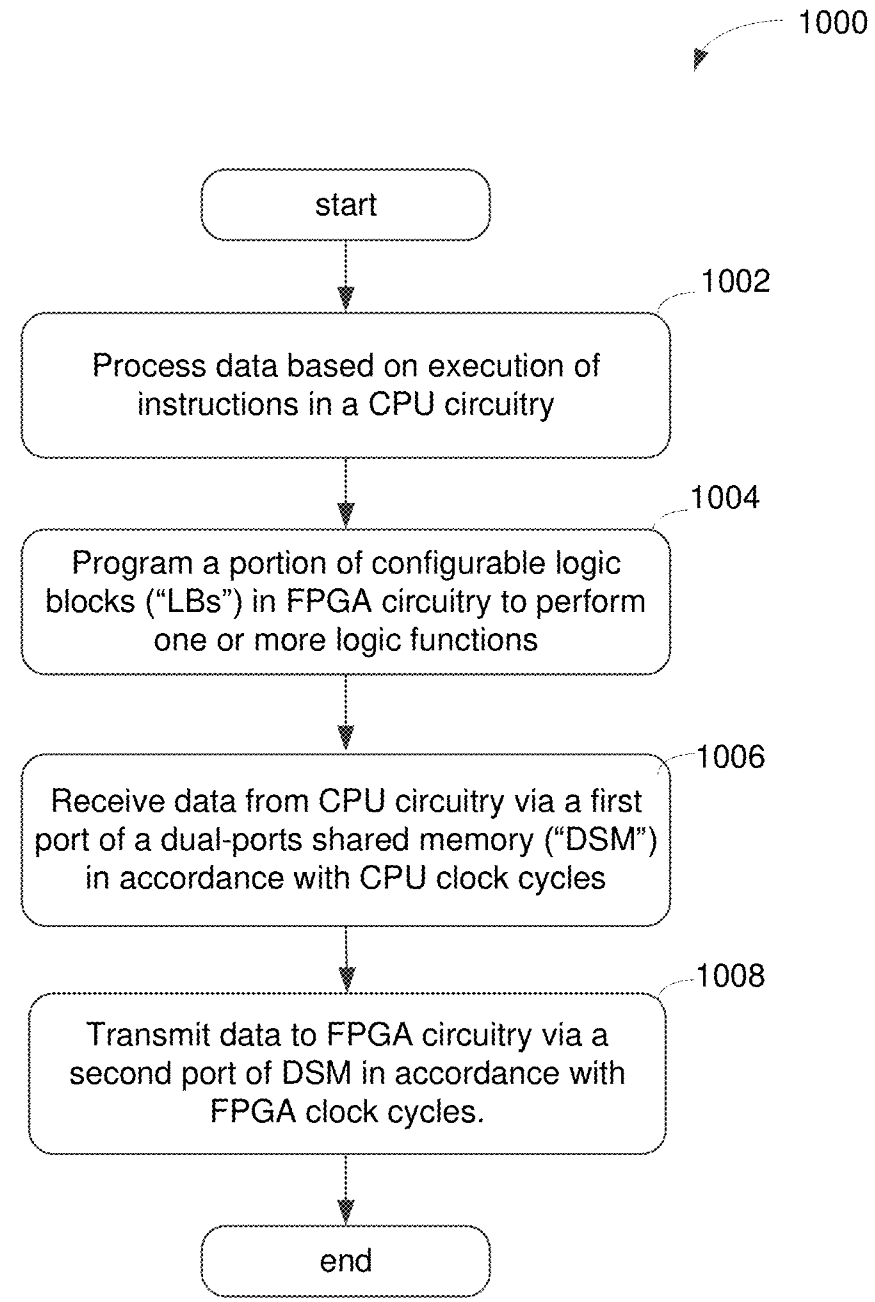
FIG. 10 is a flowchart illustrating an ICC process of DSM for facilitating ICC in an ICC system in accordance with one embodiment of the present invention.

FIG. 10 is a flowchart 1000 illustrating an ICC process of DSM for facilitating ICC in an ICC system in accordance with one embodiment of the present invention. At block 1002, a process of semiconductor die containing a shared memory for facilitating inter-circuits communications is able to process the data based on execution of instructions in a central processing unit ("CPU") circuitry in accordance with a CPU clock cycle. In one example, the process is capable of facilitating network communication in accordance with a clock speed over one (1) Gigabit per cycle ("Gbps").

At block 1004, at least a portion of configurable logic blocks ("LBs") is selectively programmed in an FPGA circuitry to perform one or more logic functions based on an FPGA clock cycle.

At block 1006, the process receives data from the CPU circuitry via a first port of a dual-ports shared memory ("DSM") in accordance with the CPU clock cycles.

At block 1008, the process transmits the data to the FPGA circuitry via a second port of DSM in accordance with the FPGA clock cycles. In one aspect, the process is able to transmit a first data stream to the CPU circuitry via the first port of DSM in accordance with a CPU clock speed over one (1) gigahertz ("GHz") and transmitting a second data stream to the FPGA circuitry via the second port of DSM in accordance with a FPGA clock speed under one (1) GHz. In an alternatively embodiment, the process stores the data received from the CPU circuitry to an external memory storage when a condition of direct memory access is detected.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A semiconductor chip containing a shared memory for facilitating inter-components communications, comprising:

a processing block configured to process data in accordance with a first clock speed;

a plurality of configurable logic blocks ("LBs") in a field programmable gate array ("FPGA") block able to be selectively programmed to perform one or more logic functions based on a second clock speed;

a dual-ports shared memory ("DSM") having a first port and a second port, wherein the first port operable in the first clock speed is coupled to the processing block and the second port operable in the second clock speed is coupled to the FPGA block for facilitating communications between the processing block and the FPGA block; and a second bus coupled between the second port and the FPGA block configured to be a wider bus than a first bus coupled between the first port and the processing block for compensating different clock speeds between the first clock and the second clock.

2. The semiconductor chip of claim 1, further comprising a memory access arbiter coupled to the FPGA block and configured to reduce memory access collisions relating to the DSM.

3. The semiconductor chip of claim 1, wherein the processing block is a microprocessor block operable under clock cycles.

4. The semiconductor chip of claim 1, wherein the processing block is a high-performance microcontroller unit ("MCU") operable over one (1) gigahertz ("GHz") clock cycles.

5. The semiconductor chip of claim 1, wherein the FPGA block is a configurable logic device operable under one (1) gigahertz ("GHz") clock cycles.

6. The semiconductor chip of claim 1, wherein the DSM includes a high-speed port operable over one (1) gigahertz ("GHz") clock cycles.

7. The semiconductor chip of claim 1, wherein the DSM includes a normal port operable under one (1) gigahertz ("GHz") clock cycles.

8. The semiconductor chip of claim 1, wherein the second port of the DSM includes wider data bus than the first port of the DSM.

9. The semiconductor chip of claim 1, wherein the DSM is a static random access memory ("SRAM") with multiple ports operable independently.

10. The semiconductor chip of claim 1, wherein the first port of the DSM and the second port of the DSM are operable independent with each other.

11. A method of semiconductor die containing a shared memory for facilitating inter-circuits communications, comprising:

processing data based on execution of instructions in a central processing unit ("CPU") circuitry in accordance with a CPU clock rate;

selectively programming at least a portion of configurable logic blocks ("LBs") in a field programmable gate array ("FPGA") circuitry to perform one or more logic functions based on an FPGA clock rate;

receiving data from the CPU circuitry via a first port of a dual-ports shared memory ("DSM") in accordance with the CPU clock rate; and transmitting the data to the FPGA circuitry via a second port of DSM through a second bus programmed to be a wider bus than a first bus coupling between the first port and the CPU circuitry for compensating different clock speeds between the CPU clock rate and the FPGA clock rate.

12. The method of claim 11, further comprising transmitting data to the CPU circuitry via the first port of DSM in accordance with the CPU clock rate and receiving the data from the FPGA circuitry via the second port of DSM in accordance with the FPGA clock rate.

13. The method of claim 11, further comprising transmitting a first data stream to the CPU circuitry via the first port of DSM in accordance with the CPU clock rate over one (1) gigahertz ("GHz") and transmitting a second data stream to the FPGA circuitry via the second port of DSM in accordance with the FPGA clock rate under one (1) GHz.

14. The method of claim 11, wherein processing data based on execution of instructions in CPU circuitry includes facilitating network communication in accordance with a clock speed over one (1) Gigabit per cycle ("Gbps").

15. The method of claim 11, further comprising storing data received from the CPU circuitry to an external memory storage when a condition of direct memory access is detected.

16. A semiconductor die containing a shared memory for facilitating circuits communication comprising:

a microprocessor circuitry configured to process data based on execution of instruction in accordance with a first clock speed operable over one (1) gigahertz ("GHz");

a plurality of configurable logic blocks ("LBs") in a field programmable gate array ("FPGA") circuitry able to be selectively programmed to perform one or more logic functions based on a second clock speed operable under one (1) GHz;

a dual-ports shared memory ("DSM") having a first port and a second port, the first port coupled to the microprocessor circuitry for facilitating communication between the microprocessor circuitry and DSM; and a second bus coupled between the second port and the FPGA circuitry configured to be a wider bus than a first bus coupling between the first port and the microprocessor circuitry for compensating different clock speeds between the first clock and the second clock.

17. The semiconductor die of claim 16, wherein the second port is coupled to the FPGA circuitry for facilitating inter-components communications between the FPGA circuitry and DSM.

18. The semiconductor die of claim 16, wherein the microprocessor circuitry is one of a microcontroller unit ("MCU"), a central processing unit ("CPU"), a graphic processing unit ("GPU"), and a digital signal processors ("DSP").

19. The semiconductor die of claim 16, wherein the DSM is a static random access memory ("SRAM") with multiple ports operable independently.

20. The semiconductor die of claim 16, wherein the DSM is configurable to handle inter-components communications for more than two components operating under different clock domains.

21. A system able to provide various digital processing functions and network communications comprising the semiconductor die of claim 16.

* * * * *